United States Patent [19]

Frankenberg

[11] 4,326,310
[45] Apr. 27, 1982

[54] MATTRESS PAD

[75] Inventor: Carl R. Frankenberg, Oceanside, N.Y.

[73] Assignee: American Foam Latex Corporation, Pittsburgh, Pa.

[21] Appl. No.: 180,048

[22] Filed: Aug. 21, 1980

Related U.S. Application Data

[62] Division of Ser. No. 87,248, Oct. 22, 1979, Pat. No. 4,260,440.

[51] Int. Cl.³ .............................................. A47C 31/00
[52] U.S. Cl. .......................................... 5/448; 5/459; 5/483

[58] Field of Search ................... 5/483, 499, 500, 501, 5/448, 459, 502, 413; 297/DIG. 5; 2/81; 427/387, 160; 428/195, 245, 246, 290, 310, 315, 317, 447, 920; 156/160, 163, 164, 178, 324

[56] References Cited

U.S. PATENT DOCUMENTS

| Re. 29,630 | 5/1978 | May | 5/483 |
| 3,273,177 | 9/1966 | Newton | 5/500 |
| 4,136,412 | 1/1979 | Wilhelm | 5/455 |
| 4,147,829 | 4/1979 | Holland | 2/81 |

FOREIGN PATENT DOCUMENTS 2229521 1/1974 Fed. Rep. of Germany .......... 5/483

Primary Examiner—Alexander Grosz
Attorney, Agent, or Firm—Carothers and Carothers

[57] ABSTRACT

A mattress pad having a porous aluminum silicone layer for reflection and retention of body heat.

2 Claims, 2 Drawing Figures

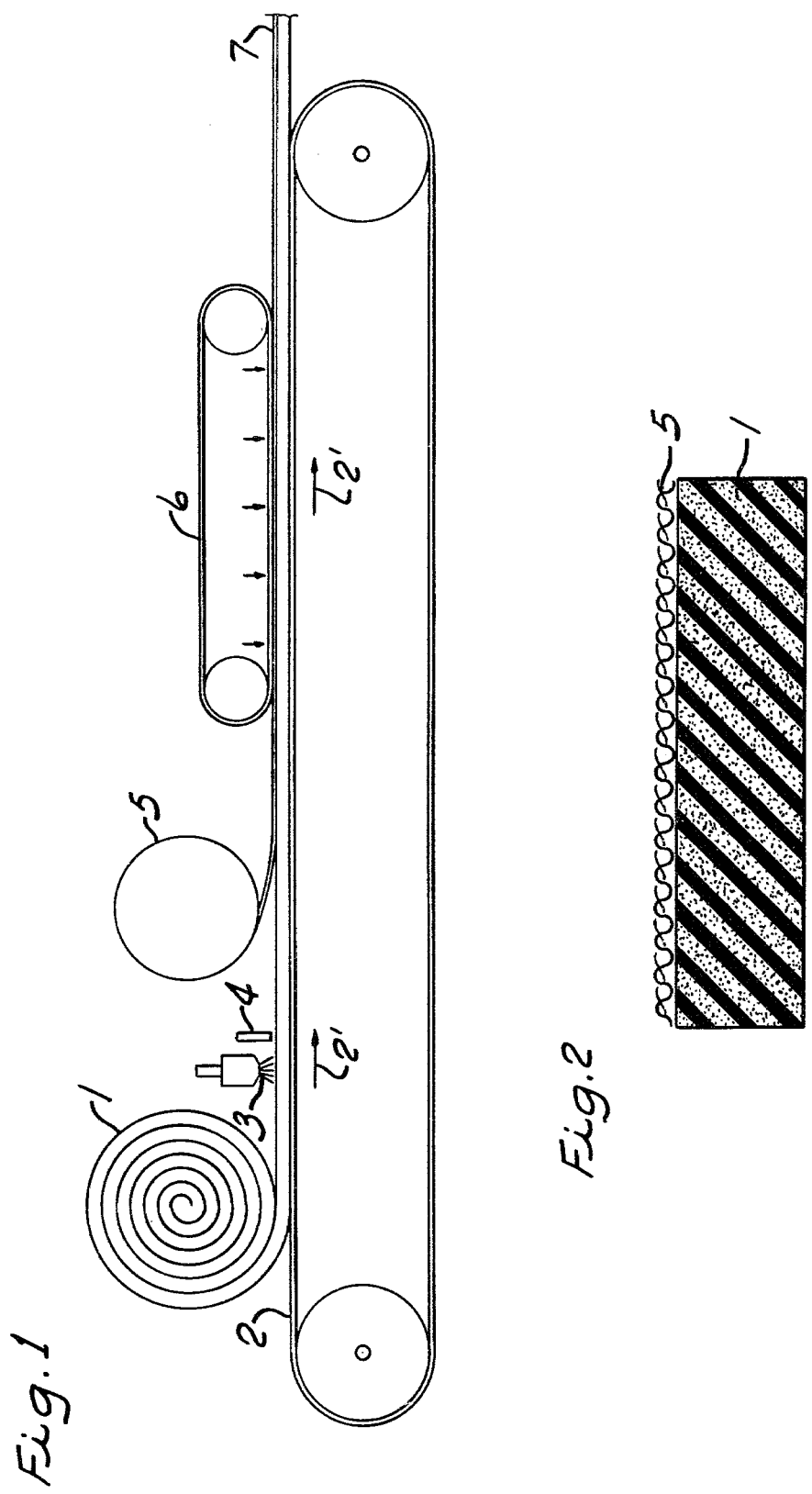

MATTRESS PAD

This is a division of patent application Ser. No. 87,248, filed Oct. 22, 1979 for Mattress Pad and Method of Manufacture, now U.S. Pat. No. 4,260,440.

BACKGROUND OF THE INVENTION

This invention relates generally to bedding and more particularly to mattress pads for overlying or covering a mattress.

Present day mattresses are constructed of materials which, while having some insulative properties, still readily dissipate body heat therein and therethrough. Thus, particularly in more recent times of energy shortages, when one sleeps on a mattress in cold surroundings, much of the body heat generated during sleep is not retained within the immediate surroundings of the person sleeping or resting, as it passes through the mattress and is dissipated within the mattress. It is thus a principal object of the present invention to provide a mattress or mattress pad which greatly assists in reflecting and retaining body heat about the person of the individual reclined on the mattress.

SUMMARY OF THE INVENTION

The mattress pad of the present invention is comprised of an elastomer foam pad to the top of which is applied a porous fabric having a coating on the top side thereof of aluminum silicone, such that the coated fabric is itself porous. The non-coated side of this coated fabric is secured to the top side of the foam pad with an adhesive. The mattress pad may be a separate piece which is placed on top of an existing mattress, or maybe formed integrally with a mattress with the aluminum silicone coating exposed upwardly to the exterior.

In applying the coated fabric to the elastomer foam pad with an adhesive, it was discovered that the coated fabric surface remained with an undesirable permanently wrinkled surface which apparently was due to the spongy nature and absorbent characterisitics of the foam pad. The present inventor has developed the method of manufacturing a mattress pad of the present invention wherein the coated fabric is readily applied to the foam padding with a resultant surface that is smooth and wrinkle free.

In the method of the present invention, a liquid adhesive is uniformly applied to the top surface of the foam pad and the underside of the porous fabric having the porous aluminum silicone coating on the top thereof is then applied under back tension to the adhesive surface of the foam pad. This layered combination is then uniformly compressed together under continuous pressure with applied heat for a sufficient time to dry the adhesive. When the mattress pad is thus removed from the pressure and heat application stage, the coated fabric was found to be securely adhered to the foam pad with a smooth or wrinkle-free surface.

When applying pressure, a preferred temperature of approximately 285° F. is utilized to provide maximum heat for drying without scorching.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a diagrammatic view in side elevation illustrating the method of the present invention.

FIG. 2 is a sectional view in side elevation of the mattress pad of the present invention.

DETAILED DESCRIPTION OF THE DRAWINGS

FIG. 1 diagrammatically illustrates the method of the present invention wherein an elastomer foam pad 1 is illustrated in rolled form and is continually permitted to unroll onto the upper surface of conveyor 2 which moves in the direction as indicated by arrows 2'.

The elastomer foam pad 1 may be any conventional synthetic foam such as polyurethane foam.

As the foam 1 unrolls onto the conveyor 2 and moves along therewith, a liquid adhesive 3, such as a synthetic latex adhesive, for example, of the type manufactured by Firestone Company as Firestone Synthetic Latex No. 257, is sprayed or flowed onto the upper surface of the foam 1 and uniformly spread thereon by a doctor blade 4.

A porous fabric having a porous aluminum silicone coating on the top side thereof is also provided in roll form as indicated at 5, and this fabric is also continually unrolled under tension or back tension and the non-coated side of the fabric is applied to the upper surface or adhesive coated surface of the foam 1 while the coated fabric is maintained taut or under tension. This combination then continues on down conveyor 2 and passes under heat and pressure belt 6 which compresses the coated fabric 5 and the foam padding 1 firmly together under pressure as indicated by the downwardly extending arrows, and at the same time applies continuous heat throughout this compressing period for a sufficient period of time to completely dry the adhesive. As the product emerges from under the heat and pressure of belt 6 to its final form as indicated at 7, the coated fabric 5 is firmly secured to the top of the foam pad 1, with a very smooth or unwrinkled surface. It has been discovered through prior experiments that without the use of the present invention, the fabric is adhered to the top surface of the foam with irregularities and wrinkles.

Referring to FIG. 2, this Figure illustrates a vertical cross-section of the finished mattress pad of the present invention, with the porous coated fabric 5 adhered to the upper surface of the foam pad 1. This foam pad 1 of FIG. 2 may be part and parcel of a mattress, or the entire mattress pad illustrated in FIG. 2 may simply be laid on top of an existing mattress.

The coated fabric 5 basically consists of a porous or breathable fabric upon the top surface of which is sprayed, poured or otherwise applied a liquid aluminum silicone coating which is permitted to subsequently dry. When the coating dries, it adheres to the fabric fibers and still leaves the entire coated fabric porous or breathable. It is necessary that the coated fabric 5 be porous or breathable, as otherwise sweating or condensation conditions may occur when the mattress pad is put to use.

While any fabric fiber will suffice, cotton cloth is preferred, as it breathes better than most synthetic fibers. As previously indicated, the porosity of the cloth must be adequate to permit breathing of the resultant coated fabric. For example, a suitable cloth would be one having a warp of 36 and a woof of 42 to the square inch. If the weave is too tight, it will not adequately breathe and all the pores will become clogged when the aluminum silicone is applied. The aluminum silicone is readily available on the commercial market.

When the mattress pad of the present invention is put to use, the foam backing or padding 1 adds insulation and yet is still breathable and also adds extra cushioning. This foam pad in combination with the porous coated fabric of luminum silicone unexpectedly provides considerable reflection and retention of the body heat to help keep the individual under covers warm even though ambient temperatures may be quite cold.

I claim:
1. A mattress pad comprising an elastomer foam pad, a porous fabric having a coating on one side of aluminum silicone such that said coated fabric is porous, the non-coated side of said fabric secured to one side of said pad with an adhesive.
2. The mattress pad of claim 1, wherein said mattress pad is an integral part of a matress with said aluminum silicone coating exposed to the exterior.

* * * * *